(12) United States Patent
Grantz et al.

(10) Patent No.: US 10,978,099 B2
(45) Date of Patent: Apr. 13, 2021

(54) BEARING SYSTEMS

(71) Applicant: GALLEON INTERNATIONAL CORPORATION, Southfield, MI (US)

(72) Inventors: Alan L. Grantz, Aptos, CA (US); Frank Sykora, Caledon (CA); David Charles Parsons, Caledon (CA)

(73) Assignee: GALLEON INTERNATIONAL CORPORATION, Southfield, MI (US)

( * ) Notice: Subject to any disclaimer, the term of this patent is extended or adjusted under 35 U.S.C. 154(b) by 0 days.

(21) Appl. No.: 16/480,616

(22) PCT Filed: Jan. 25, 2018

(86) PCT No.: PCT/US2018/015194
§ 371 (c)(1),
(2) Date: Jul. 24, 2019

(87) PCT Pub. No.: WO2018/140579
PCT Pub. Date: Aug. 2, 2018

(65) Prior Publication Data
US 2019/0348072 A1    Nov. 14, 2019

Related U.S. Application Data
(60) Provisional application No. 62/450,121, filed on Jan. 25, 2017.

(51) Int. Cl.
*G11B 5/48* (2006.01)
*F16C 19/50* (2006.01)
*F16C 33/32* (2006.01)

(52) U.S. Cl.
CPC ............ *G11B 5/4813* (2013.01); *F16C 19/50* (2013.01); *F16C 33/32* (2013.01); *F16C 2370/12* (2013.01)

(58) Field of Classification Search
None
See application file for complete search history.

(56) References Cited

U.S. PATENT DOCUMENTS 3,604,962 A * 9/1971 Larson ................. H02K 5/1675
                                              310/67 R
5,284,391 A * 2/1994 Diel ...................... F16C 17/105
                                              360/99.12

(Continued)

FOREIGN PATENT DOCUMENTS

JP    58023322 A  *  2/1983
JP    07287946 A  * 10/1995
(Continued)

OTHER PUBLICATIONS

International Search Report of PCT/US2018/015194 dated May 11, 2018, 3 pages.
(Continued)

*Primary Examiner* — William J Klimowicz
(74) *Attorney, Agent, or Firm* — Brooks Kushman P.C.

(57) ABSTRACT

A disk drive is provided with an enclosure and a disk mounted for rotation within the enclosure. The disk drive is also provided with a head mounted for rotation within the enclosure and adapted to engage the disk, a housing defining a cavity extending along an axis within the enclosure, and a shaft received within the cavity, mounted for rotation about the axis and coupled to one of the disk and the head. The disk drive is also provided with a bearing and a bearing seat. The bearing is formed generally spherical, oriented in a non-rolling configuration along the axis, and secured to one of the housing and the shaft. The bearing seat has a surface secured to the other of the housing and the shaft and biased to engage the bearing, wherein at least one of the bearing and the surface includes a low-friction coating formed thereon.

18 Claims, 8 Drawing Sheets

(56) References Cited

U.S. PATENT DOCUMENTS

| | | | |
|---|---|---|---|
| 5,510,940 A * | 4/1996 | Tacklind | G11B 21/083 |
| | | | 360/265.6 |
| 5,755,518 A | 5/1998 | Boutaghou | |
| 5,938,348 A | 8/1999 | Boutaghou | |
| 6,078,475 A * | 6/2000 | Lawson | F16C 17/08 |
| | | | 360/265.2 |
| 6,548,173 B2 | 4/2003 | Erdemir et al. | |
| 6,799,892 B2 | 10/2004 | Leuthold et al. | |
| 6,856,492 B2 * | 2/2005 | Oveyssi | F16C 21/00 |
| | | | 310/67 R |
| 7,101,085 B2 | 9/2006 | Grantz et al. | |
| 2002/0041930 A1 | 4/2002 | Erdemir et al. | |
| 2003/0126739 A1 | 7/2003 | Prater | |
| 2008/0247090 A1 | 10/2008 | Ueno et al. | |
| 2016/0118068 A1 | 4/2016 | Kaneko et al. | |

FOREIGN PATENT DOCUMENTS

| | | | |
|---|---|---|---|
| JP | 08007503 A * | 1/1996 | |
| JP | 2001167537 A * | 6/2001 | |
| JP | 2001167538 A * | 6/2001 | |

OTHER PUBLICATIONS

Written Opinion of PCT/US2018/015194 dated May 11, 2018, 11 pages.

* cited by examiner

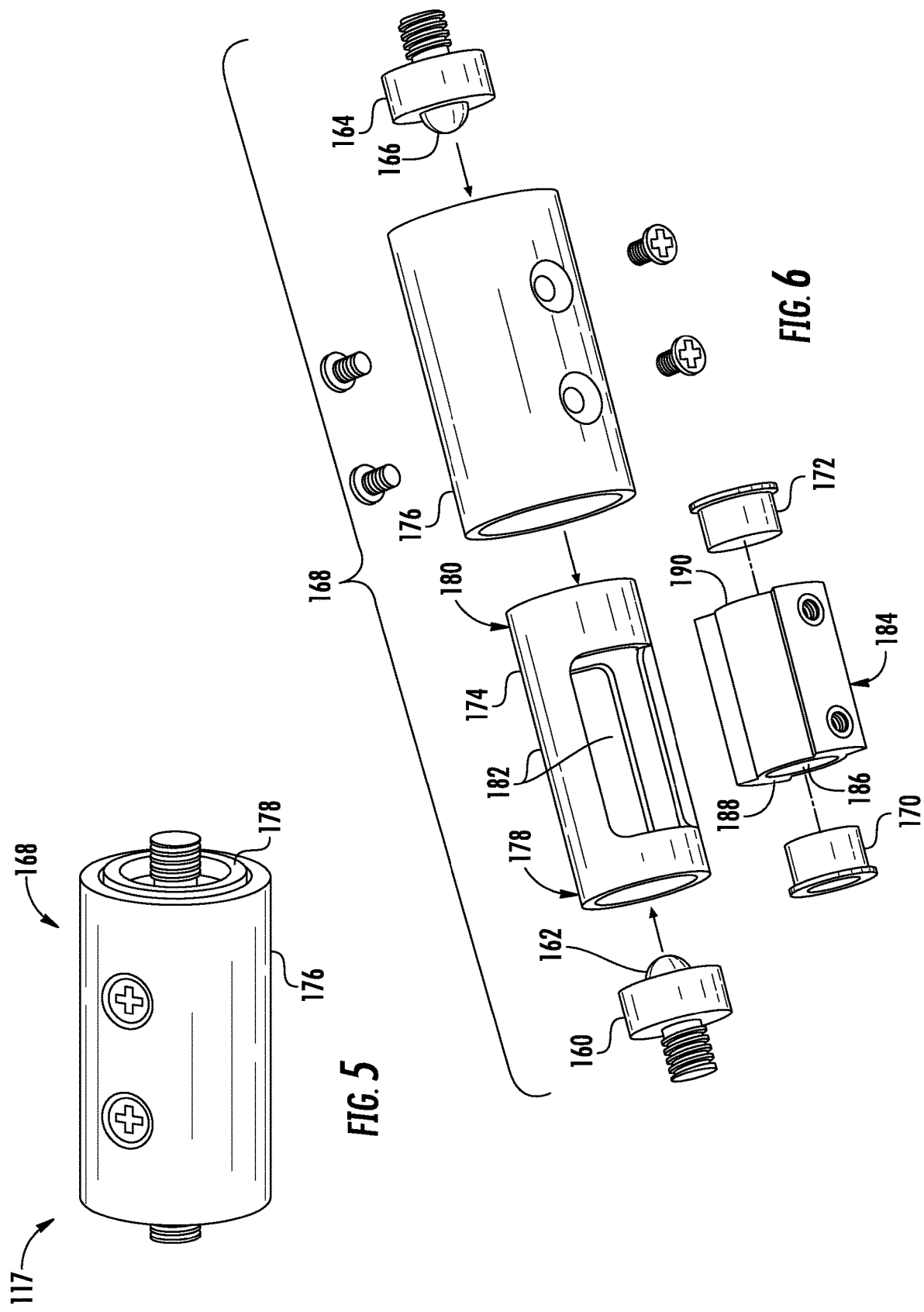

BEARING SYSTEMS

CROSS-REFERENCE TO RELATED APPLICATIONS

This application is the U.S. national phase of International Application No. PCT/US2018/015194 filed Jan. 25, 2018, which claims the benefit of U.S. provisional application Ser. No. 62/450,121 filed Jan. 25, 2017, the disclosures of which are hereby incorporated in their entireties by reference herein.

TECHNICAL FIELD

One or more embodiments relate to bearing systems for a disk drive.

BACKGROUND

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism. Disk drives are available with different speeds and different storage capacity. For example, Enterprise drives typically include multiple disks that store between 4 TB and 10 TB and rotate at 7,200 to 10,000 rpm, whereas mobile (laptop) disk drives typically include one or two disks that store between 1 GB and 3 TB and rotate at 7,200 rpm or less. Disk drives are mounted within sealed housings to protect the disks from dust, humidity and other contaminants. Disk drives may include air or other gases (e.g., nitrogen or helium) sealed within the housing.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft. Generally, the read/write heads are mounted to arms that are pivoted about a pivot shaft by the actuator mechanism. In order to facilitate such pivotal motion, one or more pivot bearings are usually disposed about the pivot shaft.

Over time, storage density has tended to increase, and the size of the storage system has tended to decrease. This trend has led to greater precision and lower tolerance in the manufacturing and operating of magnetic storage disks and of the spindle motor bearing assembly that supports the storage disk assembly and of the pivot bearing assembly that supports the read/write heads and arms.

One bearing design includes rolling element bearings. A typical rolling element bearing system includes ball bearings supported between bearing surfaces which allows a hub of a storage disk to rotate relative to a fixed member. Such typical rolling element bearing systems are susceptible to wear, run-out and poor damping capabilities.

Another bearing design includes fluid dynamic bearings. In a fluid dynamic bearing system, a lubricating fluid provides a bearing surface in a gap between a fixed member of the housing and a rotating member of the disk hub. Typical lubricants include gas such as air, oil, or other fluids. Fluid dynamic bearings spread the bearing surface over a large surface area within the gap, as opposed to rolling element bearings which include a series of point interfaces, which reduces wobble or run-out between the rotating and fixed members. Further, the use of fluid in the interface area imparts damping effects to the bearing, which helps to reduce read/write errors due to non-repeat run-out.

However, fluid dynamic bearing systems are generally operable at only one speed and are susceptible to power loss due to shear forces. A fluid dynamic bearing assembly is designed to operate at a predetermined speed, or speed range, to maintain the gap between the fixed member of the housing and the rotating member of the disk hub. Further, power is consumed by the bearings, especially at low temperatures/high viscosity, due to shear forces between the fluid and the rotating hub. Additionally, fluid dynamic bearing systems are susceptible to causing contamination within the sealed environment as oil leaks out of the bearing interface and settles on the heads and/or disks. Additionally, pivot bearings are susceptible to grease and/or lubrication degradation and leakage within the sealed environment of the disks both leading to bearing failure and/or contamination of the heads and/or disks.

SUMMARY

In one embodiment, a bearing system with dry "jewel" type bearing interfaces is provided with two balls that are located on a common center axis of rotation. The design & geometry of the bearing minimizes contact area while maximizing stiffness and self-alignment of the system while eliminating oil and the associated contamination and lube lifespan related problems. And each ball is supported by a ball holder (into which the ball is fixed) and a conical bearing seat.

In another embodiment, the ball holders are fixed to, and connected together by an inner structure, or shaft—this fixed subassembly is attached to mounting points in the system enclosure. The use of separate balls allows for the greatest precision in manufacture while minimizing manufacturing costs.

In another embodiment, apertures formed in the inner structure allow "arms" of an inner housing to be connected to an outer housing which attaches to the rotating structure (the HDD actuator arm assembly). The width of the side apertures and arms is such that a rotation of approximately 60 degrees can be obtained. The rotating structure (inner and outer housings along with two bearings seats) pivots on the two balls, which are fixed. The contacting surfaces of the balls and bearing seats are coated with NFC).

In another embodiment, the locations of the bearing seats and ball holders are reversed and the bearing seats are fixed and the ball holders and bearings rotate.

In another embodiment, the bearing holders are replaced with another set of bearing seats (for a total of four) such that there are now four NFC coated bearing surfaces.

In another embodiment, a preload spring is coupled to one or both bearing seats to provide more axial compliance. This allows some length shifting or motion within the assembly without allowing free play.

In another embodiment, the bearing system is utilized in a motor. The benefits of this design include precision of the bearing surface during manufacture. By utilizing balls, significantly greater repeatable precision can be achieved while minimizing costs. Greater precision of the bearing surface leads to improved alignment, stiffness and lower fiction (lower input energy requirements).

In one embodiment, a bearing system is provided with a housing defining a cavity extending along an axis, and a shaft received within the cavity. One of the housing and the shaft is mounted for rotation about the axis and the other is adapted for rigidly mounting within an enclosure. The bearing system is also provided with first and second bearings, and first and second bearing seats. The first bearing is formed generally spherical and oriented in a non-rolling configuration along the axis. The first bearing seat has a first surface biased to engage the first bearing, wherein one of the first bearing and the first bearing seat is secured to the housing and the other is secured to the shaft. The second bearing is formed generally spherical and spaced apart from the first bearing along the axis. The second bearing seat has a second surface adapted to engage the second bearing, wherein one of the second bearing and the second bearing seat is secured to the housing and the other is secured to the shaft.

In another embodiment, a disk drive is provided with an enclosure, and a disk mounted for rotation within the enclosure. The disk drive is also provided with a head mounted for rotation within the enclosure and adapted to engage the disk, a housing defining a cavity extending along an axis within the enclosure, and a shaft received within the cavity and mounted for rotation about the axis, wherein the shaft is coupled to one of the disk and the head. The disk drive is also provided with a bearing and a bearing seat. The bearing is formed generally spherical, oriented in a non-rolling configuration along the axis, and secured to one of the housing and the shaft. The bearing seat has a surface that is secured to the other of the housing and the shaft and biased to engage the bearing, wherein at least one of the bearing and the surface includes a low-friction coating formed thereon.

In yet another embodiment, a pivot bearing system is provided with a housing and a body having a pair of projections. The housing has a sidewall with a generally cylindrical shape that defines a cavity extending along an axis, wherein a pair of openings are formed through opposing radial portions of the sidewall. The body is received within the cavity and is mounted for pivotal motion about the axis. The pair of projections each extend radially outward from the body and through one of the pair of openings, wherein a width of each projection is less than a corresponding width of each opening to define pivotal motion limits of the body. The pivot bearing system is further provided with a bearing and a bearing seat. The bearing is formed generally spherical, centered along the axis, and secured to one of the housing and the body in a non-rolling configuration. The bearing seat has a surface that is secured to the other of the housing and the body and biased to engage the bearing.

As such the bearing system provides improvements over existing bearing systems by reducing the gap between the bearing interfaces and eliminating the pressurized fluid between the bearing interfaces which results in efficiency improvements and reduced power consumption by the spindle motor and pivot bearing during operation of the disk drive. The bearing system also allows for a disk drive that is operable over a large rotational speed range, which increases overall efficiency as compared to existing fluid bearing systems.

BRIEF DESCRIPTION OF THE DRAWINGS

FIG. 5 is a front perspective view of the pivot bearing system of FIG. 1.

FIG. 6 is an exploded view of the pivot bearing system of FIG. 5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
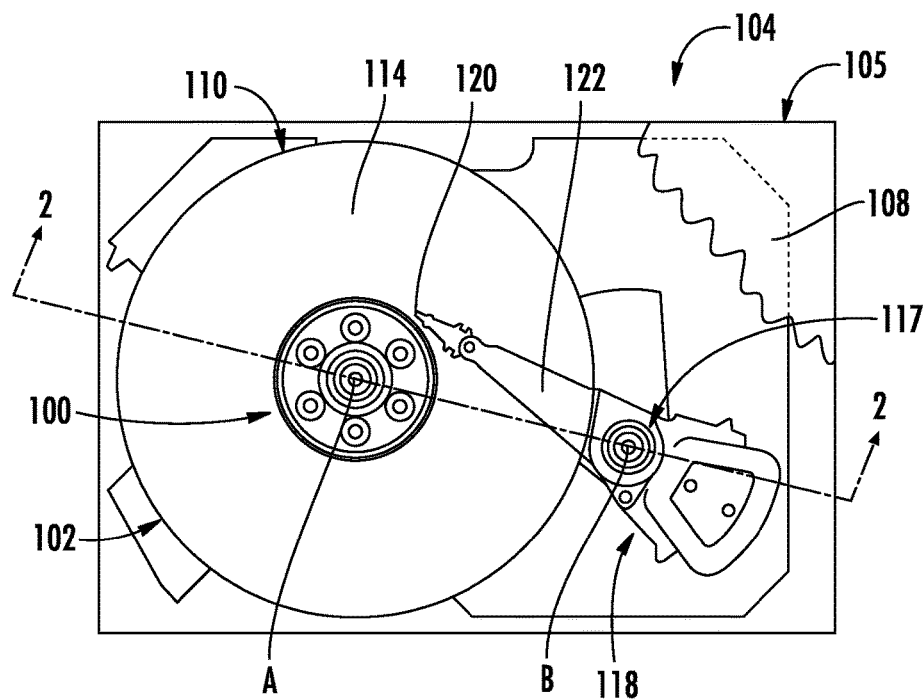
FIG. 1 is a fragmented top perspective view of a disk drive including a pivot bearing system and a motor bearing system according to one or more embodiments.

With reference to FIG. 1, a motor bearing system is illustrated in accordance with one or more embodiments, and generally illustrated by numeral 100. The motor bearing system 100 is included in a spindle assembly 102 of a disk drive 104 and aligned along an axis (A). The disk drive 104 includes an enclosure 105, or housing with a base 106 (shown in FIG. 2) and a cover 108. The cover 108 attaches to an upper portion of the housing to provide a sealed environment for components contained within the disk drive 104.

The spindle assembly 102 includes a disk pack 110 that is mounted for rotation about the A-axis. The disk pack 110 includes multiple disks 112 (shown in FIG. 2). Each disk 112 includes a disk surface 114 with a data track (not shown). The spindle assembly 102 also includes a spindle motor 116 (shown in FIG. 2) that is coupled to the motor bearing system 100 and the disk drive 104 for rotating the disk pack 110 about the A-axis.

The disk drive 104 also includes a pivot bearing system 117 according to one or more embodiments. The pivot bearing system 117 is included in an actuator assembly 118 with a plurality of heads 120 (shown in FIG. 5) that are mounted for pivotal motion about another axis (B). Each head 120 is oriented adjacent to a corresponding disk surface 114 for "reading" data from the disk 112 and/or "writing" data to the disk. The actuator assembly 118 includes a motor (not shown), such as a voice coil motor, and a plurality of arms 122. The motor is connected to each head 120 by a corresponding arm 122 for controlling the position of the head 120 to align with the corresponding data track to read/write data.

Figure 2:
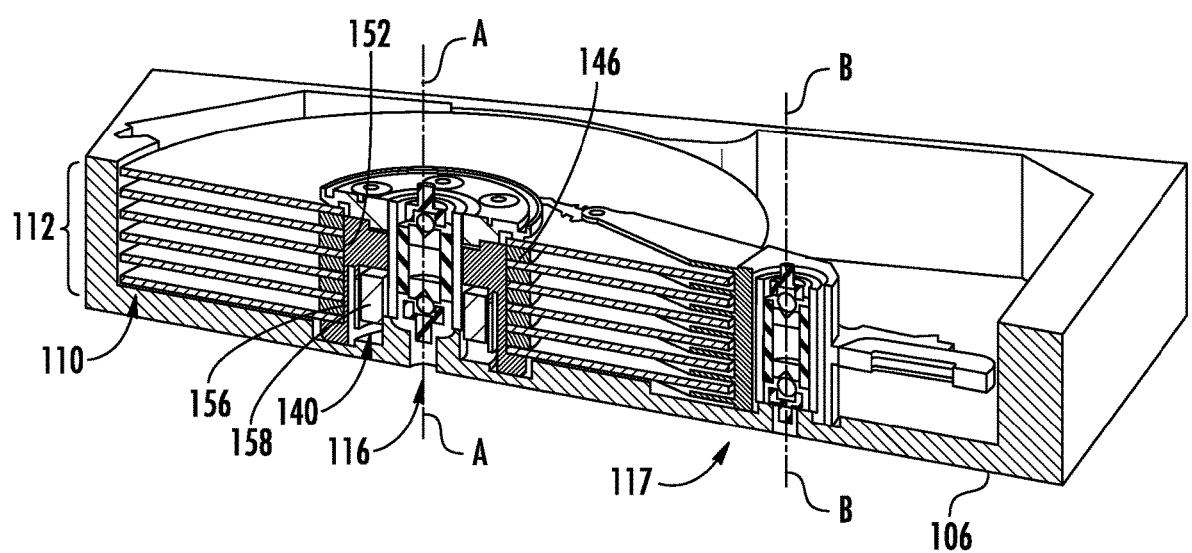
FIG. 2 is a section view of the disk drive and bearing systems of FIG. 1, taken along section line 2-2, according to one or more embodiments.

FIG. 2 is a section view of the disk drive 104 including the motor bearing system 100 and pivot bearing system 117. Both systems 100, 117 include components that are generally stationary (i.e., rotationally constrained) about their corresponding axis (i.e., the A-axis and B-axis) and components that rotate/pivot about the axis.

Figure 3:
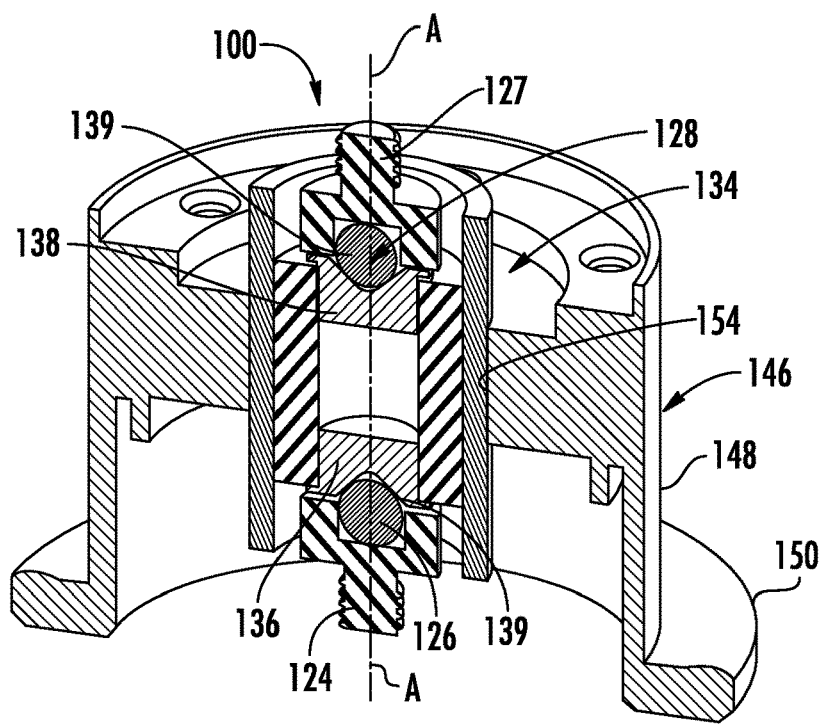
FIG. 3 is a vertical section view of the motor bearing system of FIG. 1, illustrated with a hub of the disk drive.

With reference to FIGS. 2-3, the motor bearing system 100 includes a first holder 124, a first bearing 126, a second holder 127 and a second bearing 128 that are generally stationary about the A-axis, according to the illustrated embodiment. The first holder 124 is fixed to the base 106 and the second holder 127 is fixed to the cover 108 (shown in FIG. 1). The first bearing 126 is fixed (e.g., press-fit and/or bonded) into the first holder 124. The second bearing 128 is fixed (e.g., press-fit and/or bonded) into the second holder 127.

The motor bearing system 100 also includes a cartridge assembly 134 that is mounted for rotation about the A-axis. The cartridge assembly 134 includes a first bearing seat 136 that engages the first bearing 126 and a second bearing seat 138 that engages the second bearing 128. In the illustrated embodiment, the bearing seats 136, 138 are formed with a concave surface, and the bearings 126, 128 are formed in a spherical shape. Each bearing 126, 128 is coated with a low-friction coating 139, such as a "near frictionless" coating (NFC) as described in U.S. Pat. No. 6,548,173 to Erdemir et al. The coating 139 allows the bearings 126, 128 to run in contact with the bearing seats 136, 138 without a locally pressurized fluid lubricant e.g., oil or grease, disposed in the bearing interface between the surfaces Eliminating the fluid lubricant at the bearing interface reduces shear losses which results in lower power consumption. Thus, the motor bearing system 100 provides efficiency improvements over existing dynamic fluid bearing systems.

The spindle motor 116 includes a stator 140 (FIG. 2) that is stationary, and securely mounted to the base 106 around the A-axis. The stator 140 includes windings that are wound around a core, such as a lamination stack.

The spindle assembly 102 also includes a hub 146 that is mounted for rotation about the A-axis. The hub 146 includes an outer surface 148 that defines a generally cylindrical shape and a shoulder 150 that extends radially outward from a lower portion of the outer surface 148. The disk pack 110 rests upon the shoulder 150 of the hub 146 and includes a central aperture 152 that is sized for receiving the outer surface 148. In the illustrated embodiment, the disk pack 110 is secured to a top portion of the hub 146 by one or more fasteners.

The hub 146 also includes an inner surface 154 that defines a cylindrical cavity for receiving the motor bearing system 100. The inner surface 154 is secured, e.g., press-fit and/or bonded, to an outer surface of the cartridge assembly 134 to mount the hub 146 to the motor bearing system 100. The spindle assembly 102 also includes a ring 156 that is secured to a lower inner surface of the hub 146, and typically formed of magnetically permeable steel (i.e., "backiron"). The spindle motor 116 is a DC permanent magnet motor, according to the illustrated embodiment, and includes a magnet 158 that is secured to the ring 156 and oriented radially adjacent to the stator 140. The windings 142 are connected to an electrical power source (not shown) to induce a magnetic field that interacts with the magnet 158 to rotate the hub 146 and the disk pack 110 about the A-axis.

Figure 4:
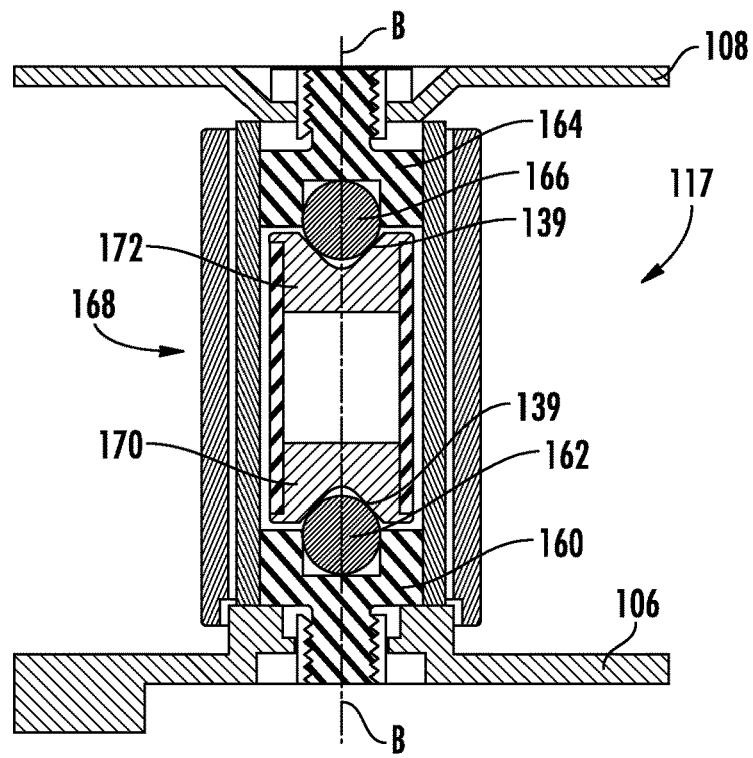
FIG. 4 is a vertical section view of the pivot bearing system of FIG. 1.

Referring to FIGS. 2 and 4, the pivot bearing system 117 includes a first holder 160, a first bearing 162, a second holder 164 and a second bearing 166 that are generally stationary about the B-axis, according to the illustrated embodiment. The first holder 160 is fixed to the base 106 and the second holder 164 is fixed to the cover 108. The first bearing 162 is fixed to the first holder 160 in a non-rolling configuration. The second bearing 166 is fixed to the second holder 164 in a non-rolling configuration.

The pivot bearing system 117 also includes a cartridge assembly 168 that is mounted for rotation about the B-axis. The cartridge assembly 168 includes a first bearing seat 170 that engages the first bearing 162 and a second bearing seat 172 that engages the second bearing 166. In the illustrated embodiment, the bearing seats 170, 172 are formed with a concave surface, and the bearings 162, 166 are formed in a spherical shape. Each bearing 162, 166 is coated with the low-friction coating 139. The coating 139 allows the bearings 162, 166 to run in contact with the bearing seats 170, 172 without a locally pressurized fluid e.g., a gas, disposed in the bearing interface between the surfaces. Eliminating the fluid at the bearing interface reduces shear losses which results in lower power consumption.

With reference to FIGS. 3 and 4, the bearings 126, 128, 162, 166 are spherical plain bearings for axial and radial loading, that are aligned along their respective axis. The bearings have high sphericity and may be referred to as "jewel" bearings according to one embodiment. Existing bearing systems (not shown) typically include a plurality of ball bearings (e.g., 26) disposed in fluid and enclosed in a housing about opposing ends of a cartridge assembly. The bearing systems 100, 117 provide advantages over such fluid bearings by reducing mass, removing oil and grease and reducing contaminants emitted by such systems into the sealed atmosphere of a disk drive or from the atmosphere degrading the lubricants within the system. An additional improvement of the bearing systems 100, 117 over existing systems is the reduction of stiction and friction in the bearing. Stiction reduction allows for improvements in both response times and improvements in operating life. This reduction is accomplished through the use of NFC coating on the bearing contact surfaces and the geometry of the bearing design.

The exposed portions of the bearings 126, 128, 162 and 166 are coated after they are secured to the corresponding holders 124, 127, 160 and 164, according to one embodiment.

With reference to FIGS. 5-6, the cartridge assembly 168 of the pivot bearing system 117, includes a fixed inner housing 174 and an outer housing 176. The inner housing 174 is cylindrical in shape with a first end 178 for receiving the first holder 160 and a second end 180 for receiving the second holder 164, such that the first and second bearings 162, 166 are disposed within the inner housing 174. The inner housing 174 is stationary and the inner diameters of the first and second ends 178, 180 are press-fit and/or bonded to the outer diameters of the holders 160, 164, according to one embodiment. In one embodiment, the bonding of the holders 160, 164 to the inner housing 174 is done utilizing a "dead weight" preload to remove all free play in the bearing system. The holders 160, 164 are fixed to the base 106 and cover 108 (shown in FIG. 4), which fixes the inner housing 174. In the illustrated embodiment, the holders 160, 164 include integrally formed threaded posts that extend axially outward to engage nuts fixed in the base 106 and cover 108. The inner housing 174 includes a pair of openings 182 formed into opposing sides.

The outer housing 176 pivots relative to the inner housing 174. The cartridge assembly 168 also includes an inner structure, or shaft, 184 that is received within the openings 182 of the inner housing 174. The inner structure 184 includes an aperture 186 that projects longitudinally through its length to define a cylindrical cavity with a first end 188 for receiving the first bearing seat 170 and a second end 190 for receiving the second bearing seat 172. The bearing seats 170, 172 are press-fit and/or bonded to the inner structure 184, according to one embodiment. The outer housing 176 is cylindrical in shape with an inner diameter sized to receive the inner housing 174. The outer housing 176 is attached to the inner structure 184, e.g., by fasteners or adhesive (not shown), and rotates relative to the inner housing 174.

Figure 7:
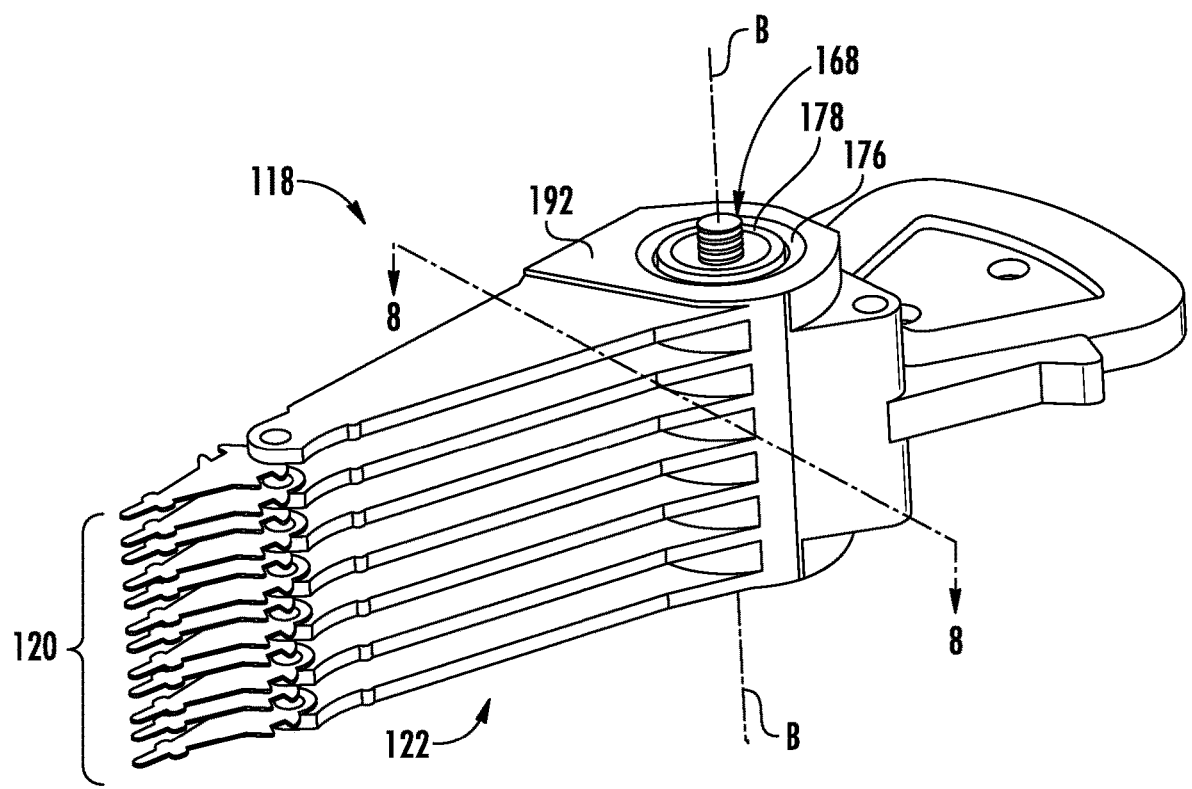
FIG. 7 is a side perspective view of an actuator assembly including the pivot bearing system of FIG. 1.
Figure 8:
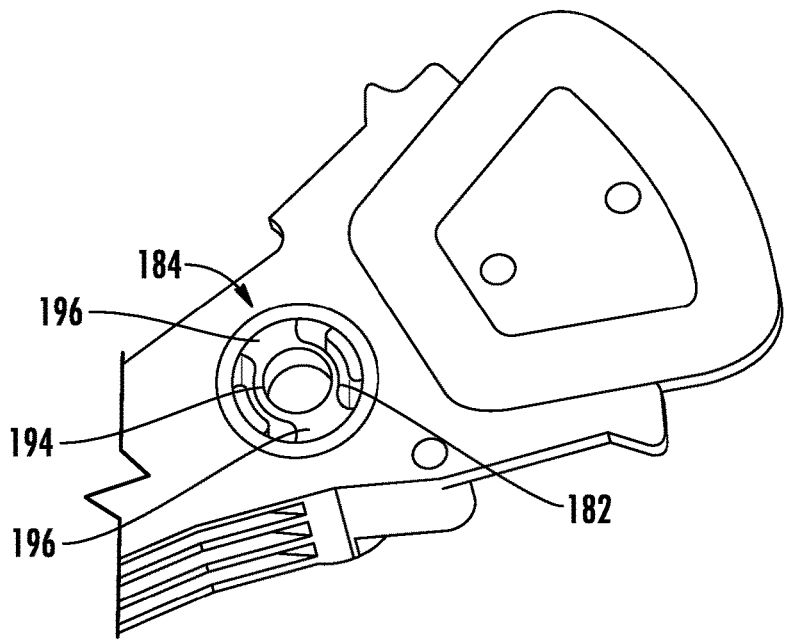
FIG. 8 is a fragmented horizontal section view of the actuator assembly of FIG. 5.
Figure 11:
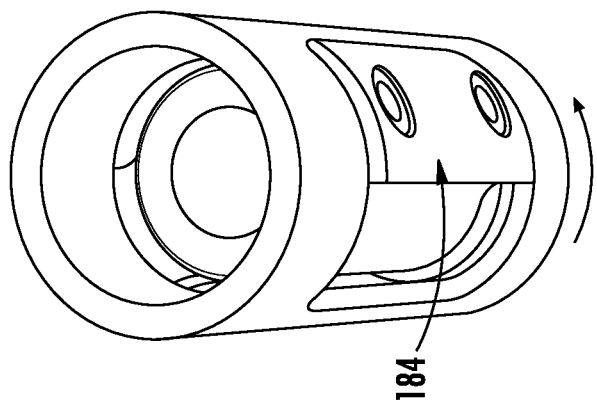
FIG. 11 is another top perspective view of a portion of the pivot bearing system of FIG. 3, illustrated in a third position.
Figure 10:
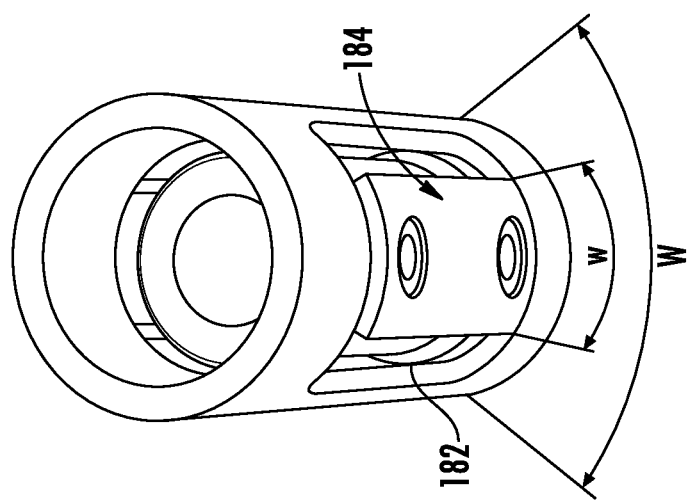
FIG. 10 is another top perspective view of a portion of the pivot bearing system of FIG. 3, illustrated in a second position.
Figure 9:
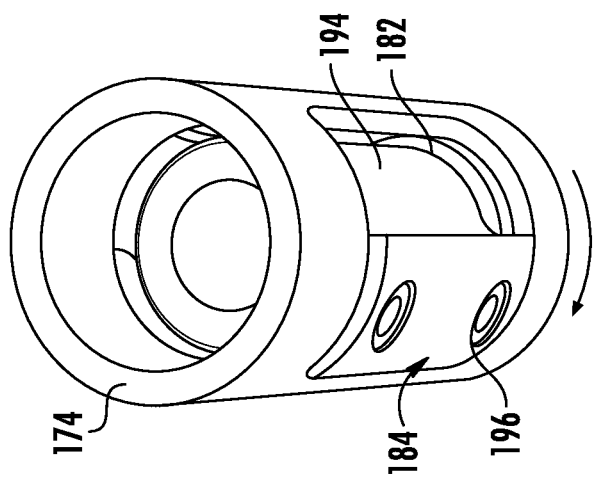
FIG. 9 is a top perspective view of a portion of the pivot bearing system of FIG. 3, illustrated in a first position.

Referring to FIG. 7, the actuator assembly 118 includes a plurality of heads 120 that are mounted for partial rotation, or pivotal motion about Axis-B. The actuator assembly 118 includes a housing 192 that is fixed to the outer housing 176 of the cartridge assembly 168. The plurality of arms 122 extend radially outward from the housing 192, and a head 120 is attached to a distal end of each arm 122.

With reference to FIGS. 8-11, the inner structure 184 of the cartridge assembly 168 pivots within the openings 182 of the inner housing 174 about axis B. The inner structure 184 includes a central portion 194 and a pair of projections 196 that extend radially outward and through the openings 182. A width (arc length) "w" of each projection 196 is less than a corresponding width "W" of each opening 182 to allow the inner structure 184 (and heads 120, shown in FIG. 7) to rotate about axis B. In one embodiment, the difference between W and w corresponds to an angle of approximately 60 degrees.

Figure 12:
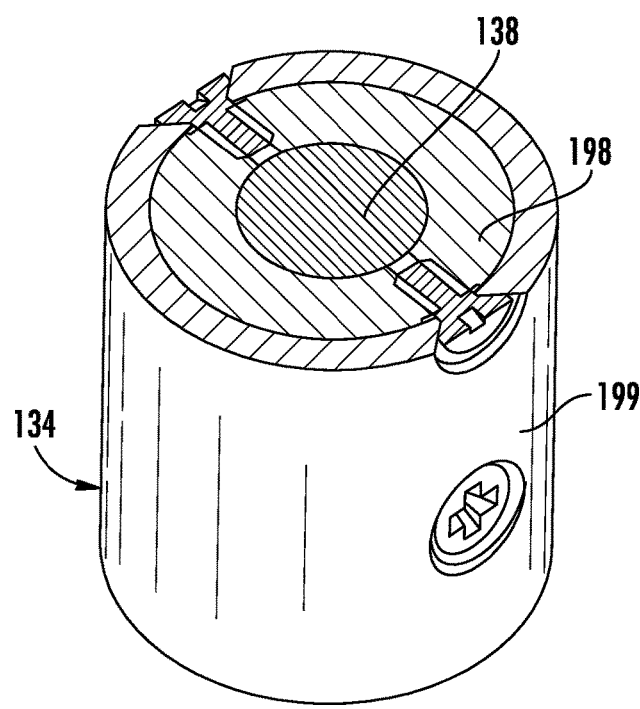
FIG. 12 is a horizontal section view of the motor bearing system of FIG. 1.

Referring to FIGS. 3 and 12, the cartridge assembly 134 of the motor bearing system 100, includes an inner housing 198 and an outer housing 199 that are fixed to each other and to the hub 146 for rotating about Axis-A. The inner housing 198 is cylindrical in shape with a first end for receiving the first bearing seat 136 and a second end for receiving the second bearing seat 138. The inner housing 198 is connected, e.g., bonded and/or press-fit, to the bearing seats 136, 138 according to the illustrated embodiment. The outer housing 199 is cylindrical in shape with an inner diameter sized to receive the inner housing 198. The outer housing 199 is attached to the inner housing 198, e.g., by fasteners or by adhesive (not shown).

The inner housing 198 and the outer housing 199 rotate relative to the fixed bearings 126, 128. The holders 124, 127 are fixed to the base 106 and cover 108, which fixes the bearings 126, 128. In the illustrated embodiment, each holder 124, 127 includes an integrally formed threaded post that extends axially outward to engage a nut fixed in the base 106 or cover 108.

Figure 13:
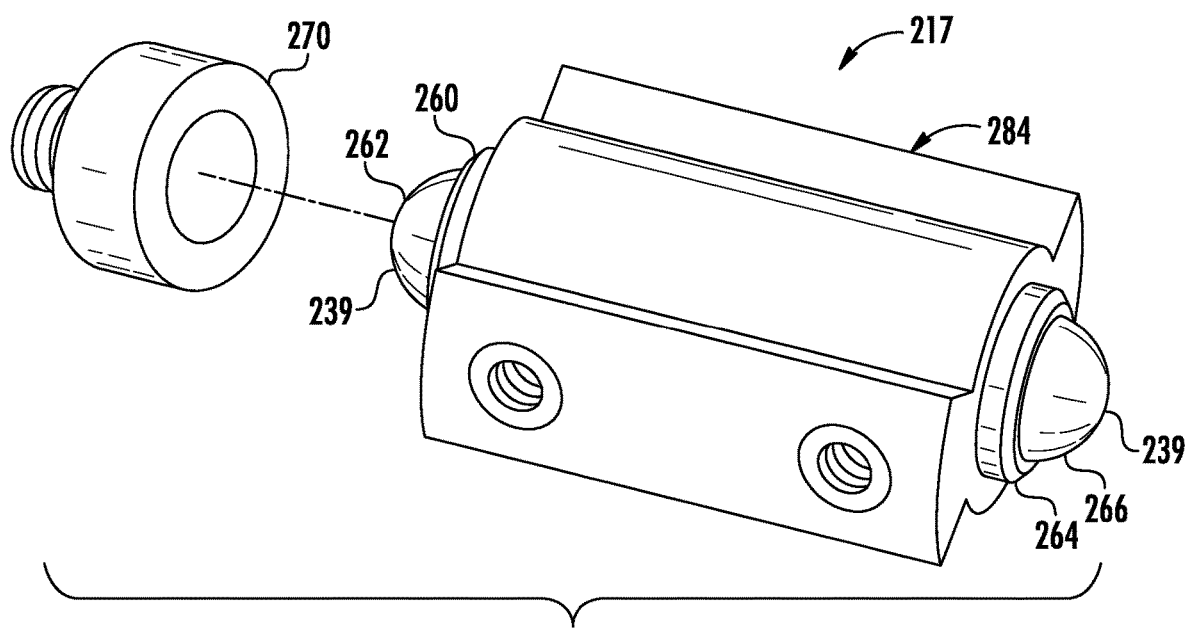
FIG. 13 is a side perspective exploded view of a portion of the pivot bearing system of FIG. 1, according to another embodiment.
Figure 14:
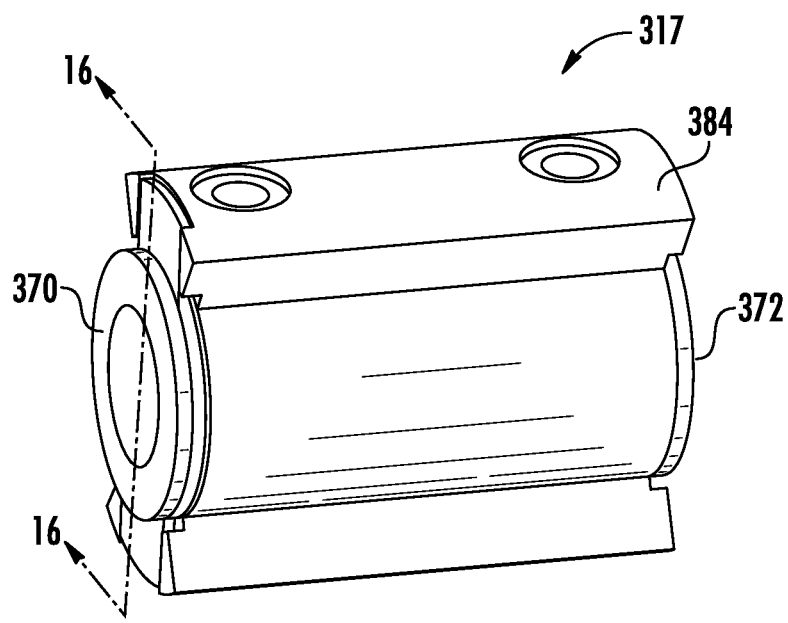
FIG. 14 is a side perspective view of a portion of the pivot bearing system of FIG. 1, according to another embodiment.
Figure 15:
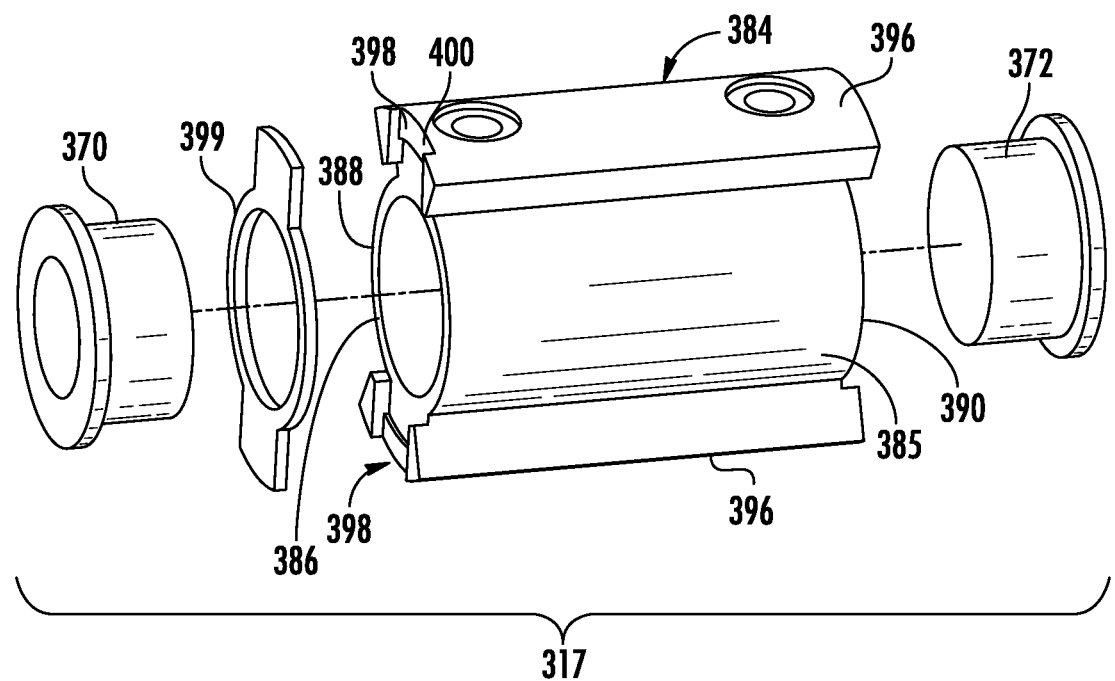
FIG. 15 is an exploded view of the pivot bearing system of FIG. 14.

FIGS. 13-15 illustrate additional embodiments of the pivot bearing system. Referring to FIG. 13, a pivot bearing system 217 having rotating bearings and fixed bearing seats is illustrated in accordance with one or more embodiments. The pivot bearing system 217 includes a first holder 260, a first bearing 262, a second holder 264 and a second bearing 266 that rotate about the B-axis (shown in FIG. 1), according to the illustrated embodiment. A first bearing seat 270 is fixed to the base 106 (FIG. 2) and the inner housing 174 (FIG. 6). And a second bearing seat (not shown) is fixed to the cover 108 (FIG. 2) and the inner housing 174 (FIG. 6).

The pivot bearing system 217 also includes a cartridge assembly with an inner structure, or shaft 284 that is mounted for rotation about the B-axis. The inner structure 284 is received by an inner housing and connects to an outer housing as described above with reference to FIGS. 5-11. In this embodiment, the first holder 260 and first bearing 262 are connected to a first end of the inner structure 284, and the second holder 264 and second bearing 266 are connected to a second end of the inner structure 284. Each bearing 262, 266 is coated with a low-friction coating 239. The coating 239 allows the bearings 262, 266 to run in contact with the bearing seats without a locally pressurized environment, e.g., fluid, gas, or grease disposed in the bearing interface between the surfaces. Eliminating the fluid at the bearing interface reduces shear losses which results in lower power consumption.

The bearing systems include interchangeable bearings and bearing seats, according to one or more embodiment. As described with reference to FIGS. 1-12, the bearing system 100, 117 may include fixed bearings (i.e., bearings and holders that are connected to the disk drive cover and base) and rotating bearing seats that are connected to rotating inner structure. As described with reference to FIG. 13, the bearing system 217 may also include rotating bearings that are connected to the inner structure; and fixed bearing seats that are connected to the disk drive cover and base. Alternatively, the bearing system may include a combination of fixed/rotating bearings and fixed/rotating bearing seats. For example, in one embodiment, the bearing system (not shown) includes a rotating first holder 260 and a rotating first bearing 262 with a fixed bearing seat 270, as described with reference to FIG. 13. This bearing system also includes a fixed second holder 164 and fixed second bearing 166 with a rotating second bearing seat 172, as described with reference to FIG. 2. Additionally, the holders and seats may be connected using threaded fasteners, press-fits, bonding, adhesive, etc. Such interchangeable bearings and bearing seats allows for the adjustment of the center of gravity, dynamic balancing, and ease of assembly of the bearing system to accommodate different applications. For example, a company may use some common components (e.g., the enclosure) for an enterprise disk drive that includes multiple disks, and for a mobile disk drive that includes a single disk. But each application has a different center of gravity. So, one application would use one configuration (e.g., two fixed bearings) and the other application would use a different configuration (e.g., one fixed bearing and one rotating bearing) to accommodate different centers of gravity.

With reference to FIGS. 14-15, a pivot bearing system that is spring biased along its axis of rotation (Axis B) is illustrated in accordance with one or more embodiments and referenced by numeral 317. The pivot bearing system 317 includes a first bearing seat 370 and a second bearing seat 372 that are fixed to opposing longitudinal ends of an inner structure, or shaft 384, like the pivot bearing system 117 described with reference to FIGS. 5-11.

The pivot bearing system 317 also includes a cartridge assembly with an inner structure, or shaft 384 that is mounted for rotation about the B-axis. The inner structure 384 is received by an inner housing and connects to an outer housing as described above with reference to FIGS. 5-11. The inner structure 384 includes a cylindrical body 385 with an aperture 386 that projects longitudinally through its length to define a cylindrical cavity with a first end 388 for receiving the first bearing seat 370 and a second end 390 for receiving the second bearing seat 372. The inner structure 384 also includes a pair of projections 396 that extend radially outward from opposing sides of the body 385.

The first bearing seat 370 is biased axially toward the first bearing (shown in FIGS. 5-11) to engage the first bearing to minimize or eliminate the gap at the bearing interface. The inner structure 384 includes a recess 398 that is formed through the body 385 and projections 396 of the first end 388. The cartridge assembly also includes a spring 399 with radially extending tabs that are received within the recesses 398 for locating the spring 399. The spring 399 has an aperture formed through for receiving the first bearing seat 370 and engaging a collar of the first bearing seat 370. The spring 399 is a flat spring, according to the illustrated embodiment, and exerts a spring force on the collar which forces the first bearing seat 370 to engage the first bearing (not shown). Further, the spring force acting on the first bearing and first bearing seat 370 transfers through the cartridge assembly to bias the second bearing (not shown) into contact with the second bearing seat 372. The longitudinal length of the projection 396 is longer than the longitudinal length of the body 385 within the recess 398, resulting in a step 400.

Figure 16:
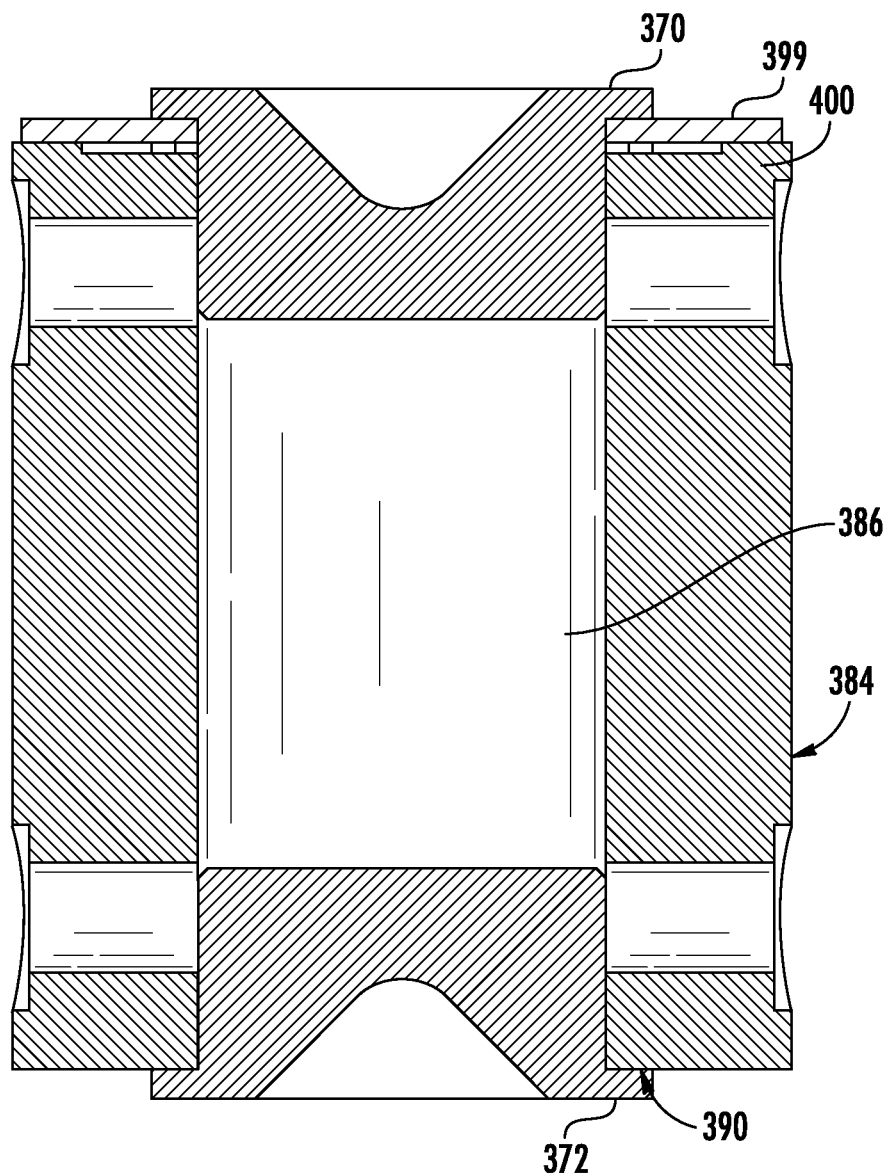
FIG. 16 is a section view of the pivot bearing system of FIG. 14 taken along section line 16-16 in a partially assembled position.

FIGS. 6, 15 and 16 illustrate a process for assembling the pivot bearing system 117, 317, according to one embodiment. First, with reference to FIGS. 15 and 16, the second bearing seat 372 is inserted into the second end 390 of the inner structure 384 and bonded in place using an adhesive. Next, the first bearing seat 370 is inserted into the aperture of the spring 399, and the collar of the first bearing seat 370 is secured, e.g., bonded to the spring 399. Then an outer tab of the spring 399 is bonded to the step 400 of the inner structure 384. Referring back to FIG. 6, next the assembled inner structure is inserted through the side openings 182 of the inner housing 174. Next, the first bearing holder 160 with first bearing 162 is bonded to the inner housing 174 and the adhesive is allowed to cure. Then the second bearing holder 164 with second bearing 166 is bonded to the inner housing 174 while an axial preload is applied to the second bearing holder 164 as the first bearing holder 160 is constrained and the adhesive cures. The first bearing seat 370 translates within the aperture 386 as the preload is applied which causes the spring 399 to deflect about the step 400. In one embodiment a preload of 1-2 N is applied, causing the spring 399 to deflect 0.01 to 0.05 mm. Then the pivot bearing system 317 is fully assembled into the disk drive (shown in FIGS. 1-2) while maintaining the preload. The preload results in an equal and opposite reaction force acting in the opposite direction, which transfers through the pivot bearing system 317 to bias the second bearing into engagement with the second seat. The spring 399 provides additional axial compliance which may be desirable to accommodate component dimensional variations due to temperature changes or manufacturing tolerances.

Other embodiments of the bearing system contemplate spherical bearings that are coated by NFC and axially constrained between two bearing seats, rather than being fixed to a holder.

Although described with reference to disk drives, other embodiments of the bearing system contemplate other applications, e.g., power tools, flow meters and gyroscopes, including applications that include oil systems or vacuums.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disk drive comprising:
   an enclosure;
   a housing disposed within the enclosure, the housing defining a cavity extending along an axis, wherein the housing includes a sidewall with an opening formed through;
   a shaft received within the cavity, the shaft comprising:
      a central portion that is received within the cavity of the housing; and
      a projection that extends radially outward from the central portion and through the opening, wherein a width of the projection is less than a corresponding width of the opening to define angular rotation limits of the shaft;
   wherein one of the housing and the shaft is mounted for rotation about the axis and the other is adapted for rigidly mounting within the enclosure;
   a first bearing formed generally spherical and oriented in a non-rolling configuration along the axis;
   a first bearing seat having a first surface biased to engage the first bearing, wherein one of the first bearing and the first bearing seat is secured to the housing and the other is secured to the shaft;
   a second bearing formed generally spherical and spaced apart from the first bearing along the axis;
   a second bearing seat having a second surface adapted to engage the second bearing, wherein one of the second bearing and the second bearing seat is secured to the housing and the other is secured to the shaft;
   at least one arm coupled to the shaft and adapted to rotate about the axis within a defined angular travel; and
   a head coupled to a distal end of the at least one arm and adapted to engage a disk.

2. The disk drive of claim 1 wherein at least one of the first bearing and the first surface includes a low-friction coating formed thereon.

3. The disk drive of claim 1 further comprising:
   a holder for supporting the first bearing, wherein the shaft is formed with a body having a first end with an aperture formed therein and extending lengthwise along the axis to receive one of the first bearing seat and the holder; and
   a spring disposed about the first end of the body and adapted to engage and bias the received one of the first bearing seat and the holder toward the non-received one of the first bearing seat and the holder.

4. The disk drive of claim 3 wherein the spring is elastically deformed to provide a spring force axially outward from the shaft along the axis to bias the received one of the first bearing seat and the holder toward the non-received one of the first bearing seat and the holder.

5. The disk drive of claim 3 wherein the spring is formed generally flat;
   wherein the shaft further comprises a step extending axially outward from a periphery of the first end of the body; and
   wherein a portion of the spring engages the step and elastically deforms during assembly to provide a spring force acting axially outward from the shaft to bias the received one of the first bearing seat and the holder toward the non-received one of the first bearing seat and the holder.

6. The disk drive of claim 1 further comprising: a holder supported by the enclosure and aligned along a second axis; a third bearing supported by the holder; a second holder supported by the enclosure and aligned along the second axis; a fourth bearing supported by the second holder and spaced apart from the third bearing; a cartridge assembly mounted for rotation about the second axis, the cartridge assembly comprising: a third bearing seat to engage the third bearing, and a fourth bearing seat to engage the fourth bearing; a hub coupled to the cartridge assembly to rotate about the second axis; and the disk, wherein the disk is mounted to the hub.

7. A disk drive comprising:
an enclosure;
a disk mounted for rotation within the enclosure;
a head mounted for rotation within the enclosure and adapted to engage the disk;
a housing defining a cavity extending along an axis within the enclosure, wherein the housing includes a sidewall with an opening formed through;
a shaft received within the cavity and mounted for rotation about the axis, wherein the shaft is coupled to the head, the shaft comprising:
a central portion that is received within the cavity of the housing; and
a projection that extends radially outward from the central portion and through the opening, wherein a width of the projection is less than a corresponding width of the opening to define angular rotation limits of the shaft;
a bearing formed generally spherical, oriented in a non-rolling configuration along the axis, and secured to one of the housing and the shaft; and
a bearing seat having a surface secured to the other of the housing and the shaft and biased to engage the bearing, wherein at least one of the bearing and the surface includes a low-friction coating formed thereon.

8. The disk drive of claim 7 further comprising:
a holder for supporting the bearing, wherein the shaft is formed with a body having a first end with an aperture formed lengthwise into the first end to receive one of the bearing seat and the holder; and
a spring disposed about the first end of the body and adapted to engage and bias the received one of the bearing seat and the holder toward the non-received one of the bearing seat and the holder.

9. The disk drive of claim 8 wherein the spring is elastically deformed to provide a spring force axially outward from the shaft along the axis to bias the received one of the bearing seat and the holder toward the non-received one of the bearing seat and the holder.

10. The disk drive of claim 7 further comprising:
a second bearing formed generally spherical and secured to one of the housing and the shaft, wherein the second bearing is centered along the axis and axially spaced apart from the bearing; and
a second bearing seat biased toward the second bearing and secured to the other of the housing and the shaft.

11. The disk drive of claim 7 further comprising: a holder supported by the enclosure and aligned along a second axis; a second bearing supported by the holder; a second holder supported by the enclosure and aligned along the second axis; a third bearing supported by the second holder and spaced apart from the second bearing; a cartridge assembly mounted for rotation about the second axis, the cartridge assembly comprising: a second bearing seat to engage the second bearing, and a third bearing seat to engage the third bearing; a hub coupled to the cartridge assembly to rotate about the second axis; and wherein the disk is mounted to the hub for rotation about the second axis.

12. The disk drive of claim 7 wherein the head is mounted for rotation about the axis.

13. A pivot bearing system comprising:
a housing having a sidewall with a generally cylindrical shape that defines a cavity extending along an axis, wherein a pair of openings are formed through opposing radial portions of the sidewall;
a body received within the cavity and mounted for pivotal motion about the axis;
a pair of projections, each projection extending radially outward from the body and through one of the pair of openings, wherein a width of each projection is less than a corresponding width of each opening to define pivotal motion limits of the body;
a bearing formed generally spherical, centered along the axis, and secured to one of the housing and the body in a non-rolling configuration; and
a bearing seat having a surface secured to the other of the housing and the body and biased to engage the bearing.

14. The pivot bearing system of claim 13 wherein at least one of the bearing and the surface includes a low-friction coating formed thereon.

15. The pivot bearing system of claim 13 wherein the bearing seat is biased to engage the bearing without a lubricant disposed therebetween.

16. The pivot bearing system of claim 13 further comprising:
a holder for supporting the bearing, wherein the body includes a first end and a second end spaced apart from the first end with an aperture extending therebetween and adapted to receive one of the bearing seat and the holder; and
a spring disposed about the first end of the body and adapted to engage and bias the received one of the bearing seat and the holder toward the non-received one of the bearing seat and the holder.

17. The pivot bearing system of claim 16 wherein the spring is elastically deformed to provide a spring force axially outward from the body along the axis to bias the received one of the bearing seat and the holder toward the non-received one of the bearing seat and the holder.

18. A disk drive comprising:
an enclosure;
a disk mounted for rotation within the enclosure;
a pivot bearing system according to claim 13;
at least one arm coupled to the pair of projections and adapted to pivot about the axis within a defined angular travel; and
a head coupled to a distal end of the at least one arm and adapted to engage the disk.

* * * * *